INVENTOR.
Sandor Holly
BY
Bernie A. Lipper
Attorney

INVENTOR.
Sandor Holly
BY
Attorney

INVENTOR.
Sandor Holly
BY
Bernie A. Lipper [signature]
Attorney

INVENTOR.
Sandor Holly
BY
Bernie A. Lepper
Attorney

INVENTOR.
Sandor Holly
BY
Bruce A. Lippman [signature]
Attorney

ALLOWED MODES OR INCIDENT ANGLES

ALLOWED RADII OF ELECTRON ORBIT $\omega_e$ = CONSTANT
$\theta = \theta_c$

ALLOWED RADII OF ELECTRON ORBIT
$\pi/2 > \theta > \theta_c$

ALLOWED ANGULAR VELOCITY RANGE

INVENTOR.
Sandor Holly
BY
Attorney

INVENTOR.
Sandor Holly
BY [signature]
Attorney

United States Patent Office 3,348,093 Patented Oct. 17, 1967

3,348,093

METHOD AND APPARATUS FOR PROVIDING A COHERENT SOURCE OF ELECTROMAGNETIC RADIATION

Sandor Holly, Cambridge, Mass., assignor to Arthur D. Little, Inc., Cambridge, Mass., a corporation of Massachusetts.

Filed June 14, 1963, Ser. No. 287,937
9 Claims. (Cl. 315—3)

ABSTRACT OF THE DISCLOSURE

A source of electromagnetic radiation, particularly in the millimeter and submillimeter wavelength region. The source generates Cerenkov radiation and include a dielectric ring resonator and means for establishing a crossed electrostatic field and electromagnetic field to impart orbital motion to supplied electrons.

This invention relates to electromagnetic radiation and more particularly to method and apparatus for generating electromagnetic radiation in the millimeter and submillimeter wavelength region.

The useful spectrum of electromagnetic radiation ranges from the X-ray band to the broadcast band. In terms of wavelegth, this is from about 0.1 Angstrom to about 1 kilometer; in terms of frequency from about $30\times10^{18}$ to $30\times10^{4}$ c.p.s. Many devices are available as sources of electromagnetic radiation in the various bands of this broad range. Included in these are the devices which generate electromagnetic waves used in radios, TV, radar and microwave devices. There are also, of course, the visible light spectrum as well as means for generating ultraviolet and X-ray radiation. In the wavelength range between microwaves and the visible spectrum, there is a band which encompasses wavelengths in the millimeter and submillimeter range which is sometimes referred to as the far infrared region. For this band which will be termed the millimeter and submillimeter wavelength region, sources of monochromatic, and particularly coherent, radiation are conspicuously lacking. Monochromatic radiation as used hereinafter may be defined as radiation at a single frequency. However, the phases of individual wavelets are uncorrelated and generally spatial incoherence results. Emission from materials with line spectra can be mentioned as an example of monochromatic radiation.

"Coherent signal" or "coherent radiation" as used hereinafter, on the other hand, may be defined as radiation in which there are difinite relationships concerning the phase of the signal in space at successive periodic instances of time. Masers and lasers are examples of this class. In master-type generators external boundary conditions enforce the space coherence of monochromatic but otherwise independent wavelets. Resonant or traveling-wave type structures are used in general for this purpose. The term coherent therefore places more restriction on an output radiation than monochromatic. As space-time coherence is required for most applications the method and apparatus of this invention, which is concerned with providing a coherent source of radiation includes a suitable resonator as described later in detail. However, it can be appreciated that if space coherence of the output is not needed, the dielectric medium does not have to be a resonant structure. Therefore, "coherent" will be used in such a non-restricted manner.

For a fuller understanding of the nature and objects of the invention, reference should be had to the following detailed description taken in conjunction with the accompanying drawings in which.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

Figure 1:
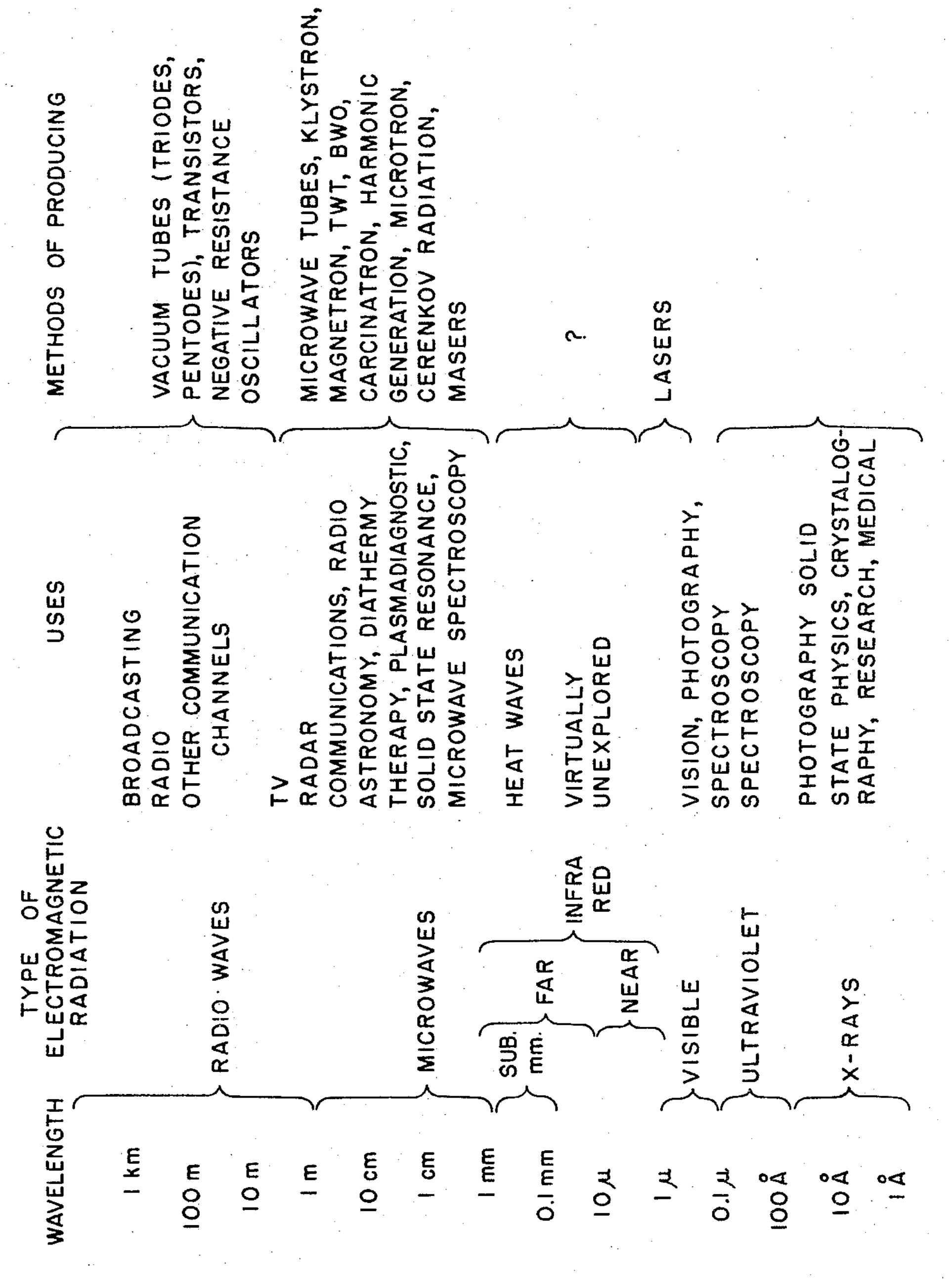
FIG. 1 is a chart of the electromagnetic spectrum, the uses for the various wavelength regions and the various devices available for generating radiation in various spectrum bands.

The chart in FIG. 1 summarizes very briefly the sources of radiation which are now available to us in the various wavelength regions. It will be seen that there is a real gap in the wavelength region which may be defined between about 1 mm. and about 10 microns. The method and apparatus of this invention are concerned with providing a coherent source of radiation in the microwave, millimeter and submillimeter region which, it will be seen, spans this gap.

The availability of a coherent source of radiation in the submillimeter and millimeter wavelength region opens up an entire new brand of the electromagnetic spectrum for basic and applied research as well as for commercial applications. For example, a coherent source of electromagnetic radiation in this region can be used in molecular spectroscopy, solid state resonance studies, and in biophysics research. This wavelength band can also be made available for communications, radio astronomy, telemetry and the like.

There are at present a number of approaches to the solution of the problem of providing a coherent source of radiation in the millimeter and submillimeter wavelength region. These approaches may be generally classified as those which are based upon quantum mechanics, the use of nonlinear materials or upon classical free-electron devices.

The operation of quantum mechanical oscillators involves radiative transition of electrons of an active material stimulated by the electromagnetic field of a resonator to which the active material is coupled. This quantum approach has so far proved to be the only really successful way of generating coherent optical radiation with appreciable power output in the visible range, but considerable difficulties in achieving maser-type action in the far infrared have been experienced due to strong phonon absorptions in the materials in this frequency range. There are, therefore, no masers operating in the far infrared.

The second approach has been through the use of the nonlinear property of some media. By using a sufficiently high harmonic of an incident microwave power, it is possible to achieve at least in principle some coherent power at a frequency in the submillimeter wavelength region. By mixing two laser beams in a nonlinear medium, a different frequency lying in the far infrared can be developed. However, the efficiency of such schemes is characteristically very low, and at present appears impractical for most applications.

At present, classical attempts at solving the problem of coherent power generation in the far infrared depend either upon the scaling down of presently available and working microwave sources or by searching for new nonconventional approaches to devices which can provide a new type of bunched beam, a new field containment structure, or a new type of beam structure interaction. In this type of device, the highest frequency with reasonable power has so far been achieved by the so-called CSF carcinotron. But difficulties have been experienced in accurately focusing and aligning the dense electron beam; and other difficulties appear to arise from working with the very small components and small dimensional tolerances required.

It has been known for some years that radiation from the lowest frequencies to as high as the near ultraviolet is possible employing a phenomenon known as Cerenkov radiation. This is, in effect, a shockwave phenomenon which will be discussed in some detail below. However, such attempts to utilize Cerenkov phenomenon in a practical system for generating radiation in the millimeter and submillimeter range have not been entirely successful because of various operating conditions which have made the devices employed expensive and difficult to operate. For example, in a presently available device using Cerenkov radiation of beam is emitted from a 20 kv. electron gun and passed through a prebunching cavity of the klystron type. In the cavity the beam is velocity modulated, and as it emerges is accelerated to several million electron volts, and then passed through a Teflon cone. The inherent efficiency of such a device is very low. One of the primary difficulties encountered in the use of Cerenkov radiation in such devices is the fact that the electrons required to establish Cerenkov radiation in a dielectric must be continuously supplied from a source (either as a steady stream or bunched) and after interception by a collector their energy is lost to the system. This, of course, is one of the primary reasons for the very low power output attained by the presently available Cerenkov radiators.

The method and apparatus of this invention, in contrast to the prior art methods and apparatus, provide the means for employing Cerenkov radiation in an efficient manner, requiring that only that quantity of energy be put into the system which is needed to make up that which is extracted therefrom as Cerenkov radiation and to provide for any minor losses due to operational inefficiencies.

It is therefore the primary object of this invention to provide a source of coherent electromagnetic radiation in the millimeter and submillimeter wavelength region for widely varied applications. It is another object to provide an electromagnetic radiation source of the character described which is efficient and at the same time simple and practical to operate. It is yet another object of this invention to open up a band of electromagnetic radiation in a wavelength region from about a few millimeters to about 0.03 millimeter for applications such as communications, telemetry, radio astronomy, and research, as well as for now unforseeable uses, by providing a practical, efficient and economical coherent source of such radiation. Other objects of the invention will in part be obvious and will in part be apparent hereinafter.

The radiation source of this invention comprises a hollow cylindrical body formed of a dielectric material evacuated within and polished on its inner and outer surfaces which is hereinafter designated the dielectric resonator; means within the dielectric resonator for generating electrons; means for generating a magnetic field parallel to the longitudinal axis of the dielectric resonator and adapted to maintain the electrons in orbit within the dielectric resonator; driving means associated with the dielectric resonator and being adapted to provide energy, sufficient to impart a predetermined angular velocity to the electrons in orbit; and means for extracting a portion of the electromagnetic radiation developed in the dielectric resonator.

The source of electromagnetic radiation of this invention is in fact a coherent source of radiation in the millimeter and submillimeter wavelength region based upon the phenomenon of so-called Cerenkov radiation. For convenience, it will hereinafter be called a radiation source.

In general the method of this invention may be described as one which generates a coherent (continuous or pulsed) source of electromagnetic radiation in the millimeter and submillimeter wavelength band and which comprises the steps of driving electrons in a circular path in close proximity to the inner surface of a hollow cylindrical dielectric material in vacuum at an angular velocity sufficient to establish Cerenkov radiation in the dielectric material whereby the electrons are continuously used to generate electromagnetic radiation; supplying to the electrons energy in the microwave frequency range at an amplitude sufficient to impart to the electrons energy equivalent to that lost through radiation and other mechanisms such as electron interception with the wall of the dielectric resonator and the like; and directing at least a portion of the energy of the gathered Cerenkov radiation thus developed as a coherent source to a desired area of use.

The wavelength of the electromagnetic radiation provided by the radiation source of this invention may vary over a wide range and is determined by the proper selection of the operational and design parameters, e.g., dielectric material and physical dimensions of the hollow cylindrical body, the inner wall of which defines the circular path of the electrons, the angular velocity of the orbiting electrons, and their nearness to the dielectric surface. In the use of the radiation source of this invention it is theoretically possible to generate a coherent source of electromagnetic energy in the frequency region from approximately $10^{10}$ c.p.s. to about $10^{13}$ c.p.s., depending upon the dielectric material used.

It will be seen from the description presented below that the metallic microwave cavity (driving means) surrounding the dielectric resonator of this invention provides for the continuous use and de-energization of the electrons traveling at relativistic velocities thus eliminating the inefficiencies encountered in other Cerenkov devices which use linear beams of electrons. Once such linear beams of electrons pass beyond the dielectric surface in which Cerenkov radiation is generated their residual energy is lost, making the generators which use them very inefficient. In contrast, the resonator of this invention retains such residual energy in the system.

In order to better understand the radiation source of this invention it will be helpful to very briefly review the phenomenon of Cerenkov radiation (see for example Jelley, "Cerenkov Radiation and Its Applications," Pergamon Press, London, 1958). This phenomenon is observed when a particle (such as an electron) is passed through a dielectric or adjacent the surface of a dielectric in vacuum. For purposes of this discussion and in the following description a dielectric is defined as a material which has a dielectric constant larger than unity and which is an electrical insulator or in which an electrical field can be sustained with a minimum dissipation of power. For purposes of this device the dielectric should be a material which exhibits a very low loss tangent and one which has a relatively high $\epsilon_1/\epsilon_2$ where $\epsilon_1$ is the dielectric constant of the material and $\epsilon_2$ is the dielectric constant of the medium surrounding the dielectric resonator, e.g., air ($\epsilon_2=\epsilon_0$). The dielectric should, moreover, have good polishing properties and should be isotropic (have a uniform dielectric constant) in the plane of the resonator. Suitable dielectric materials include, but are not limited to, saphire, quartz, rutile, lithium fluoride and polytetrafluoroethylene.

Figure 2:
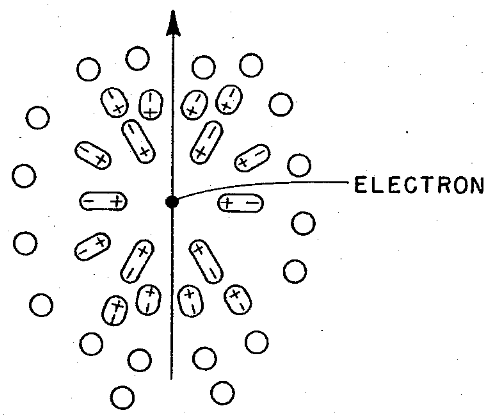
FIG. 2 is a diagram illustrating the behavior of atoms in the path of a traveling electron.

In understanding the Cerenkov radiation phenomenon it should first be recognized that when a charged particle such as an electron is directed along a path adjacent to the surface of a dielectric material in a vacuum the atoms making up the dielectric material become polarized in the vicinity of the electron path. When the atoms are polarized by the electron they behave like elementary dipoles with their positive poles attracted to and their negative poles pointing away from the track of the passing particle (see FIG. 2). Thus as the electron passes along the medium surface a perturbation will simultaneously travel in the dielectric along with the electron at the same speed. If the electron continuously interacts with matter along its track, there will be a continuous line of successively delayed point sources, each polarized elemental region along the track emitting spherical dipole waves.

At large distances away from the electron path, these individual spherical waves will be cancelled through mutual interference with other spherical waves, unless the electron (and correspondingly the perturbation which travels with it) is moving faster than the velocity of light in the dielectric material.

Figure 3:
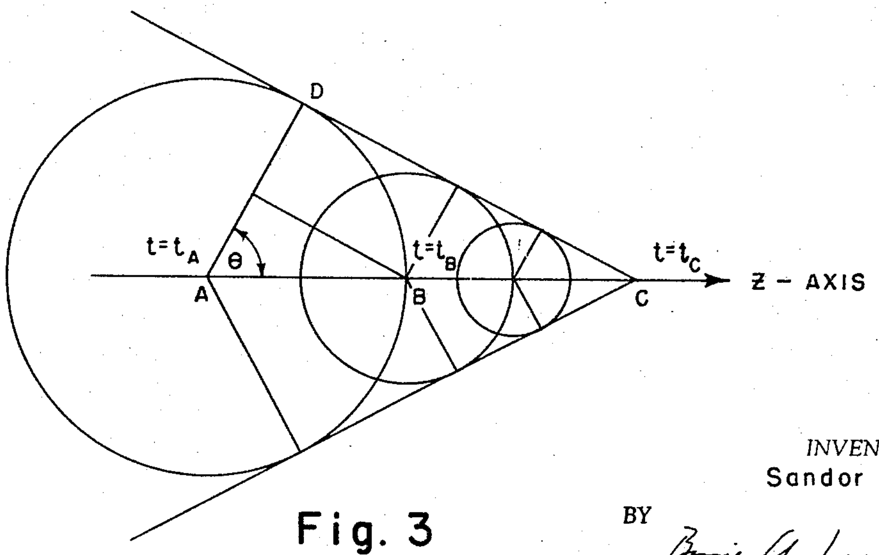
FIG. 3 is a diagram showing the formation of wave fronts due to an electron traveling at high velocity.

For this second case (which is shown in FIG. 3) one can always find a direction for which the individual spherical waves interfere constructively, thus giving rise to a wave front traveling in this direction with the velocity of propagation characteristic of the dielectric material. Thus there is established within the dielectric medium a type of shockwave phenomenon. One may think also of this as being the electromagnetic analogue to the generation of a bow wave from a ship which arises when it moves through the water at a speed exceeding the velocity of the surface waves thereon.

If a uniform dielectric material, which extends to infinity, surrounds the electron path as illustrated in FIG. 3, a wavefront is formed under these conditions in the shape of a cone whose angle is given by the Cerenkov relationship. Referring to FIG. 3 this relationship may be expressed mathematically as follows:

$$\cos\theta=\frac{AD}{AC}=\frac{c}{n}\cdot\frac{1}{v_e}=\frac{1}{\beta n} \qquad (1)$$

where $\theta$ is the angle at which the conical wavefront is traveling with respect to the electron path or Z axis, $c$ is the velocity of light in vacuum, $n$ is the index of refraction of the dielectric material which may also be expressed as $\sqrt{\epsilon}$, where $\epsilon$ is the dielectric constant of the dielectric material, and $1/\beta$ is the ratio of $c$ to $v_e$, the velocity of the electron with respect to the dielectric.

In the case where the electron travels with a velocity $v_e$ which is greater than the critical Cerenkov velocity, i.e., $v_e>c/n$, then there are three nonvanishing field vectors $H_\phi$, $E_r$ and $E_z$ in the electromagnetic wave which propagates at an angle $\theta$ away from the electron track. These vectors may readily be expressed mathematically. The H lines are circles with centers on the Z-axis, while the E lines are straight lines which at any instant of time originate at the point occupied by the electron. The radiated energy is calculated by determining the radial component of the Poynting vector and integrating over the surface of a cylinder which encloses the path of the electron. The radiated energy per unit length of path has been expressed (see Journal of Physics (U.S.S.R.) 1, 439 (1939)) as $$\frac{dW}{dl}=\frac{e^2}{c^2}\int_{-\infty}^{\infty}\left(1-\frac{1}{\beta^2n^2}\right)\omega d\omega \qquad (2)$$

or $$\frac{dW}{dt}=\frac{e^2v_e}{c^2}\int_{-\infty}^{\infty}\left(1-\frac{1}{\beta^2n^2}\right)\omega d\omega \qquad (3)$$

where

1=path length
$e$=electron charge
$\omega$=angular frequency=$2\pi f$
$W$=energy of the total radiation.

According to the above equations the frequency spectrum of the radiation of a single particle is continuous and its amplitude is linearly proportional to the frequency $\omega$. Under the integral sign there is a factor $$\left(1-\frac{1}{\beta^2n^2}\right)$$

which varies with the dielectric constant. The dielectric constant of all known materials is frequency dependent, a fact which must be taken into account. This means that the spectrum of the radiation yield does not grow linearly with the frequency. For most materials it will reach a maximum somewhere in the visible or near ultra-violet range, and for higher frequencies it drops rapidly to zero. One has to evaluate the infinite integrals of Equations 2 and 3, only for the frequency interval for which $\beta n>1$.

It is readily possible to estimate the radiation yield of a single electron in terms of erg cm.$^{-1}$ sec.$^{-1}$. Assume, for example, a 10 percent band of the visible range of the spectrum and conditions where $\beta\approx1.0$. Further assume that the dielectric material is LiF, having a constant dielectric constant $\epsilon=1.9$ in the frequency range of interest; and that $f=6\times10^{14}$ c.p.s. For a 10 percent band, i.e., $\Delta f=\frac{1}{10}f=6\times10^{13}$ c.p.s. (4760 A$<\lambda<$5260 A.), the estimated optical radiation yield is $\approx10^{-10}$ erg cm.$^{-1}$ sec.$^{-1}$. Considering the high sensitivity of presently available photomultipliers and other detecting devices, it is therefore quite possible to make single electrons "visible."

Similar calculations show that under identical conditions the power delivered in the microwave region, e.g., around $f=3\times10^{11}$ c.p.s., in a 10 percent band is reduced with respect to that in the optical region by about a factor of one million. Such power is of course a very small quantity.

If N electrons are traveling at random locations in a beam, the total radiated power will be N times that of a single electron.

Figure 4:
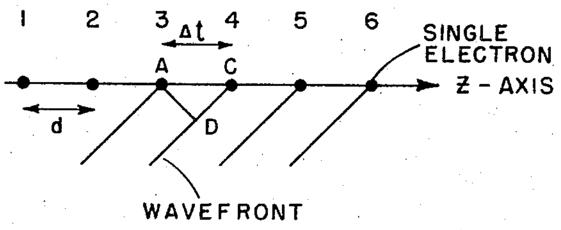
FIG. 4 is a diagram showing the formation of wave fronts due to a string of electrons traveling at high velocity.

It is necessary now to consider a stream or string of single electrons, each traveling with a velocity $v_e$ in the Z direction and each being spaced from the other by distance $d$ (see FIG. 4). Synchronism of phase velocities requires that while the electron travels from point A to point C in time $\Delta t$, the wave which was initiated at point A travels from point A to point D. Only those frequency components ($\omega_m$) of the whole spectrum radiated by each electron will survive in the interferences which are in phase. For those frequency components one may write $$2m\pi=\omega_m\cdot\Delta t \qquad (4)$$

where $m$ is an integer.

If now the frequency of electrons is defined as $$f_e=\omega_e/2\pi=1/\Delta t$$

Equation 4 may be written as $$m=\omega_m/\omega_e \text{ or } \omega_m=\omega_e \qquad (5)$$

It follows then that all those frequencies which are radiated non-destructively, that is, coherently $\omega_m$, called the eigenfrequencies of the system, are given by Equation 5.

The radiation yield per cm. sec. for this simple model of a string of single electrons is given by $$\frac{dW}{dl}=\frac{e^2\omega^2}{c^2}\sum_{m=1}^{m_{max}} m\left(1-\frac{1}{\beta^2\epsilon}\right) \qquad (6)$$

It will be appreciated that Equation 6 is the sum of the energies radiated at the finite number of discrete eigenfrequencies given by Equation 5. In this summation, the upper limit is $m_{max}$ which indicates the highest harmonic of the fundamental frequency $f_0$ $(=v_e/d=1/\Delta t)$ at which $\beta n>1$ still holds.

Further in this simple analysis, electron bunches may be substituted for the individual electrons of the previous model of a string of electrons. There will then be N electrons in each bunch, the size of which is assumed to be negligible compared to the separation distance $d$ and the wavelength of the radiated frequency. In this model $e^2$ of Equation 6 is replaced with $(Ne)^2$. In contrast to the case of electrons at random where the radiated power is only N times that of a single electron, in the above scheme of bunched electrons the emitted power in proportional to $N^2$, the coherence of electrons in time and space being responsible for the extra N factor in the expression for power radiated which can be as large as $10^9$ or greater.

Turning from the case of electrons traveling in a straight line, it is possible now to consider a single electron traveling in a circular orbit. If a DC magnetic field is applied the electron is forced into a circular orbit or path in a plane which is perpendicular to the DC magnetic field. By theoretical analysis it is possible to show (Journal of Applied Physics, May 1962, pp. 1864–70; and Proceedings of the Physical Society, 79, Part 4, pp. 816–818 (1962)) that in contrast to a continuous output spectrum of the model of electrons moving linearly, the electron moving in an orbit emits a discrete frequency spectrum which consists of the orbital frequency of electrons and of all of its higher harmonics for which $\beta n>1$.

The total emitted energy per cycle of the electron in orbit can be found by summing the energies appearing in these higher harmonics instead of by integrating over the entire frequency spectrum as was necessary in the previous case where the electron was traveling in a straight line. Thus the equation for the energy radiated by a single electron traveling in an orbit can be related to that for the linear case by replacing the Fourier integral representation of the fields with a Fourier series representation thus $$\frac{dW}{dl}=\frac{e^2 4\pi^2}{c^2T^2}\sum_{m=1}^{m_{max}} m\left(1-\frac{1}{\beta^2 n^2}\right) \qquad (7)$$

Radiation out of the "current ring" during one period of the electron motion becomes $$W=\frac{e^2}{c^2}\frac{8\pi^3 a}{T^2}\sum_{m}^{m_{max}} m\left(1-\frac{1}{\beta^2 n^2}\right) \qquad (8)$$

where due to the periodicity of the electron motion the angular frequency of radiation ($\omega$) is replaced by $2m\pi/T$, $d\omega$ and $\omega_e$ by $2\pi/T$ and the integration by a summation over all higher harmonics of the frequency of revolution of the orbiting electron for which $\beta n>1$. Here T is the time it takes the electron to complete one orbit. In the above expression $a$ represents the radius of the electron orbit and $m$ is an integer.

If a bunch of electrons is substituted for a single electron and the size of the bunch is small compared to the wavelength of the emitted radiation, then the factor $N^2$ (where N is the number in a bunch) enters into the energy calculation in the same manner as it did in the case of electron bunches traveling linearly.

In order to complete the explanation of the operation of the radiation source of this invention it will be helpful now to describe the dielectric resonator component.

It has been shown both theoretically and experimentally that pieces of materials with high dielectric constants and low microwave losses can be good high frequency resonators. These dielectric cavities use the phenomenon of total internal reflection, that is the surface between air and a dielectric will be a perfect reflector of waves if the angle of incidence is greater than the critical angle. Losses experienced by this kind of resonator arise mainly from absorption in the dielectric material, provided sufficient care is taken to form the dielectric surfaces very smooth.

Low loss transmission of microwave and optical frequencies through fibers have been demonstrated experimentally. The electromagnetic waveguiding property of these fibers is also based on total internal reflection. However, the actual use of dielectric cavities as resonators, filters for microwaves and optical frequencies is very recent. (See for example Proceedings of the IRE, p. 2081, October 1962. The experimental devices so far constructed show very low losses and therefore very high Q's for these cavities. Hereinafter Q is used to represent the figure of merit, quality factor of an energy storing system and may be defined in the conventional way as $$Q=\omega W_s/P_d$$

where $\omega/2\pi$ is the frequency of operation
$W_s$ is energy stored
$P_d$ is power dissipated If $P_d$ represents power dissipation in the resonator only (losses in the resonator wall and material filling the cavity) then Q is equal to an unloaded Q. If $P_d$ includes both internal losses and the power taken out of the resonant system by a suitable coupling mechanism, the resulting Q value will be referred to as the loaded Q of the system in keeping with conventional practice.

Returning to the discussion of dielectric resonators, unloaded Q's of the order of a million and higher have been measured. These values are at least one order of magnitude higher, than one can achieve with metal-walled cavities.

Figure 5:
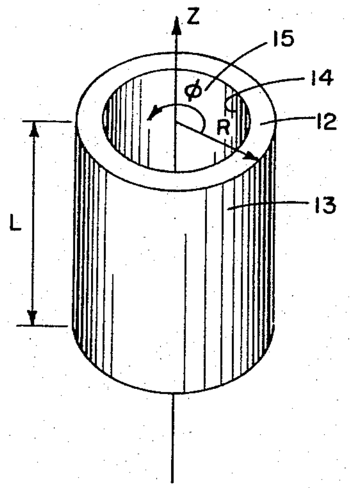
FIG. 5 illustrates a "traveling-wave" type dielectric resonator.

One special class of dielectric resonators is that which may be designated the "traveling-wave" type. A geometry of a traveling-wave type dielectric resonator which is used in the radiation source of the invention is shown in FIG. 5, which illustrates a traveling-wave dielectric resonator formed of a hollow cylinder 12 having an outer surface 13, an inner surface 14 and a circular inner volume 15. The hollow cylinder has a length L, a longitudinal axis Z and an outer radius R. The dimension L of the cylindrical body in FIG. 5 has no restriction except there should be no tapering of the cylinder in the Z direction. The cylindrical body should be highly circular in the $R-\phi$ plane which is the plane perpendicular to the Z axis of the dielectrc cylinder. Both the outer and inner surfaces 13 and 14 of this cylinder should be highly polished to provide smooth surfaces. The degree of smoothness may be defined as that which possesses irregularities much smaller than the wavelength of the operating frequency of the resonator.

Once a wave is generated inside the dielectric resonator structure of FIG. 5 it will travel around this toroid in the $\phi$ direction. Depending on the circumference, and the dielectric guide wavelength waves can be cancelled or constructively added. It can be seen that a standing wave pattern in a traveling-wave type dielectric resonator can be set up by simply superimposing two waves which are traveling in opposite directions. Considering only the modes which are set up by total internal reflection between the inner and outer walls of the cylinder and which have no variation in the Z direction, it can be shown that if the circumference of the toroid is equal to an integer times the dielectric guide wavelength one has constructive interference, that is resonance in the ring for that frequency.

Very recently ruby has been formed in this geometry and operated as a laser (Journal of Applied Physics, April 1963, p. 956). The characteristics of the output indicated an extremely high Q in the order of $10^8$–$10^9$.

An alternate way of arriving at this resonant geometry is by starting with a solid cylindrical rod. If the dielectric constant of the material of the rod is $\epsilon$, that of the surrounding medium $\epsilon_0$ (assuming air), then the critical angle characteristics of this medium is $$\theta_c=\sin^{-1}\frac{1}{n}=\sin^{-1}\sqrt{\frac{\epsilon_0}{\epsilon}} \qquad (9)$$

which is derived from Snell's law. Any angle which is equal to or greater than $\theta_c$ is a total internal reflecting angle.

Figure 6:
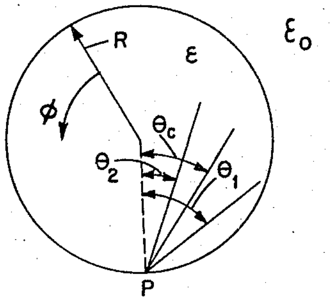
FIG. 6 represents a cross-section of a dielectric cylinder with electromagnetic rays incident at different angles at a point P on its surface.

FIG. 6 shows a solid cylinder or rod with a line constructed perpendicular to the surface at a point (P) in its outer surface. The critical angle, $\theta_c$, and two other angles, $\theta_1$ and $\theta_2$, are shown—$\theta_1$ being greater and $\theta_2$ being smaller than $\theta_c$. In terms of geometrical optics, those rays which strike the outer surface at angle $\theta_1$, will be completely reflected back into the dielectric and no radiation which carries power can escape. On the other hand, angles smaller than $\theta_c$ ($\theta_2$ in FIG. 6) will result in a partial loss of energy at each reflection. An analogy of this situation to the conventional microwave circuits would be a very heavily over-coupled high-Q cavity.

It can easily be seen that if the outer surface is a perfectly circular cylindrical surface, the incident angle of a ray at each successive reflection will be conserved. One can state this fact in another way—that is, in the $R-\phi$ plane the angle of incidence uniquely determines the mode of operation in a solid cylinder, that is, one particular mode of oscillation has only one distinct angle of incidence; and only one mode can be set up by one incident angle. This means that any one of all of the high Q modes which develop through total internal reflection in the $R-\phi$ plane can be referred to by giving its $\theta$ which is a scalar quantity between $\theta_c \leqq \theta < \pi/2$.

Figure 7:
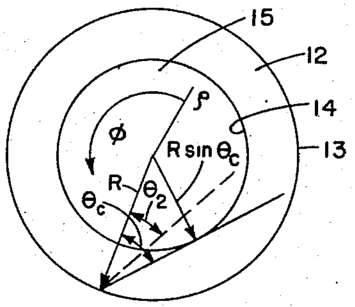
FIG. 7 illustrates that part of a dielectric cylinder which is essential to support high Q modes.
Figure 8:
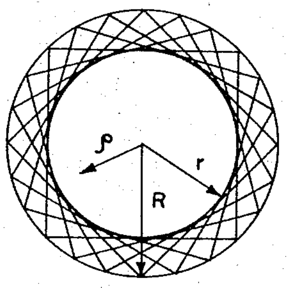
FIGS. 8 and 9 show the rays of two different modes (with different incident angles) in the otherwise identical dielectric ring resonators.
Figure 9:
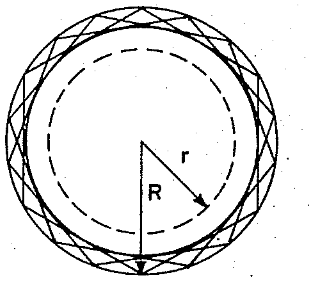

Since those rays which strike the outer surface of the cylindrical rod at an angle less than the critical angle will not be totally internally reflected, these rays cannot produce modes within the resonator having a high Q. It can be seen from FIG. 6 and also FIG. 7 that the essential portion of the resonator of all the high Q modes may be reduced to a hollow cylinder or annulus as illustrated in FIGS. 5 and 7. The inner radius of the dielectric ring resonator obtained this way is $R \sin \theta_c$, which can easily be seen from FIG. 7. FIGS. 8 and 9 show the rays of two different modes (with different incident angles) in two otherwise identical dielectric ring resonators.

If the radius of the outer surface is R, the radius of the inner surface $r$ and $0<r<R \sin \theta_c$, then only the outer cylindrical surface takes part in totally internally reflecting the waves in the resonator for any one of the high Q modes. Thus only the outer surface needs polish in this case. If, however, the dimensions of the ring are such that $R \sin \theta_c<r<R$, then reflections will occur alternately from inner and outer surfaces for those modes, the $\theta$ of which falls between $\theta_c<\theta\leqq \sin^{-1} r/R$. The remainder of the modes (that is those with $\theta$ in between $\sin^{-1} r/R<\theta<\pi/2$) will still remain one-sided modes, that is reflected by the outer surfaces only.

Figure 10:
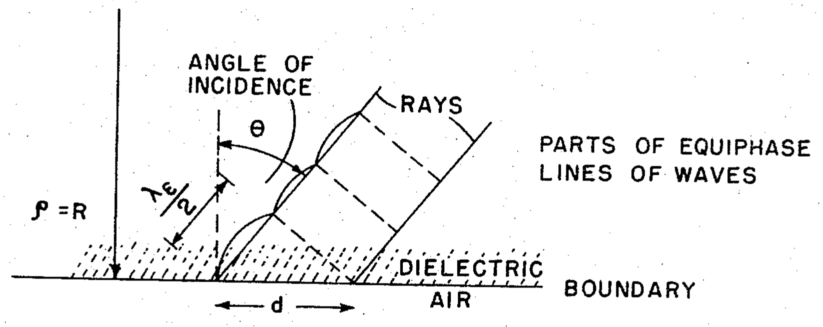
FIG. 10 illustrates a small portion of the outer surface of a dielectric cylinder on which rays of electromagnetic radiation are incident, showing parts of equiphase lines of waves.

There are several relations between angles, distances, dielectric constants, which may be mentioned here. FIG. 10 shows a small portion of the outer surface of the dielectric cylinder. It is assumed that $\theta_c<\theta<\pi/2$ in FIG. 10. It is advantageous to define at this point the angular dielectric guide wavelength hereinafter referred to as (ADGW) which is constant for constant radii. At any $r$, projecting the ADGW onto the direction of the electromagnetic rays at that $r$ will give $\lambda_\epsilon$, which is the wavelength in the dielectric and which is assumed to be constant throughout the material.

The half distance of ADGW in FIG. 10 is indicated by $d$ at $s=R$, that is at the outer surface. It is easily seen that for $\theta$ given $$d=\frac{\lambda_\epsilon}{2 \sin \theta}$$

the value of $d$ can range between $\lambda_0/2$ (free space half wavelength when $\theta=\theta_c$ and $\lambda_{\epsilon/2}$ (half wavelength in dielectric) and $\theta=\pi/2$. For resonance one must have at R $2\pi R=2md$, that is $d=R\pi/m$.

The relation between an incident angle of a mode, $\theta$, the radius of the dielectric cylinder, R, the number, $n$, of wavelengths around the circumference, and $\epsilon$ or $\lambda_\epsilon$ can then be expressed as $$\frac{\lambda_\epsilon \cdot n}{2\pi R}=\sin \theta \qquad (10)$$

The ADGW reduces linearly for values of $s$ smaller than R. At $s=\alpha R$ (where $\alpha<1$)

$$\text{ADGW}|_{\alpha R}=\frac{2\pi\alpha R}{n}$$

On the other hand $\alpha$ can take only values for which $$\frac{2\pi\alpha R}{n}\geq\lambda_\epsilon$$

which gives the smallest meaningful value of $\alpha$ to be $$\alpha=\frac{\lambda_\epsilon \cdot n}{2\pi R}\ (=\sin \theta) \qquad (11)$$

Figure 11:
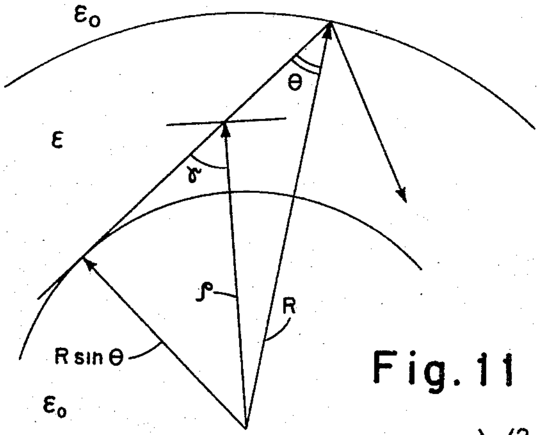
FIG. 11 represents a part of a dielectric cylinder defining selected angles, directions and distances.

It follows then that at $s=\alpha R=R \sin \theta$ the ADGW$=\lambda_\epsilon$. The direction of the rays which strike the outer surface at an angle $\theta$ can be given in terms of angle $\gamma_\theta=\gamma_\theta(s)$ in FIG. 11, where for $R \sin \theta \leqq s<R$ one has $\pi/2\leqq\gamma(s)<\theta$, or $$\gamma(s)=\theta \sin^{-1}\frac{R}{s}$$

Figure 12:
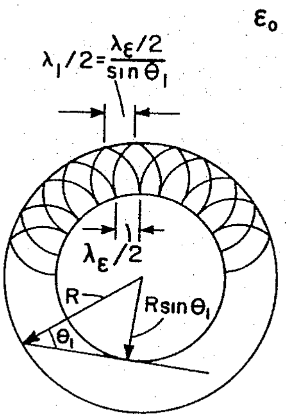
FIGS. 12 and 13 show mode pattern in the form of equiphase lines which are orthogonal to those in FIGS. 8 and 9.
Figure 13:
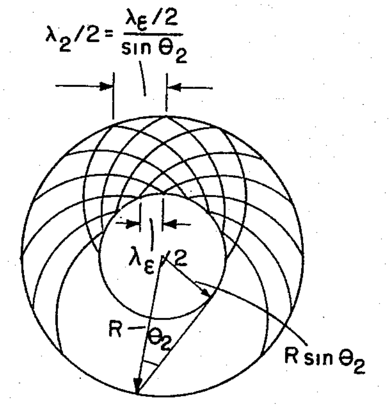

In FIGS. 12 and 13 there are shown mode patterns in the form of equiphase lines (that is lines orthogonal to those in FIGS. 8 and 9) in the $R-\phi$ plane for two cylindrical resonators having the same outer radius but the modes themselves having different $\theta$'s.

The above description of Cerenkov radiation and discussion of the operational characteristics of a traveling-wave type dielectric resonator may be combined to present four different basic cases illustrating the coupling of a Cerenkov radiating electron (or electron bunch) and a dielectric resonator, one of which will form the basic system of the radiation source of this invention.

In this presentation reference should be made to FIGS. 14 through 17, each of which shows a much-enlarged segment of a dielectric cylinder with a dielectric constant $\epsilon$, a critical angle $\theta_c$ and an outer radius R. The interior of the dielectric cylinder is a vacuum, and in each of the four cases an electron or electron bunch is traveling with a constant tangential velocity $v_e$ and in an orbit of constant radius which in all cases is very close to but less than the inner radius of the dielectric cylinder.

The following discussion presents a two-dimensional system because the system is uniform in the third dimension (Z-axis). In an actual device operating in three dimensions the electron is replaced by a line of electrons and the electron bunch is replaced by a column of electrons.

Figure 14:
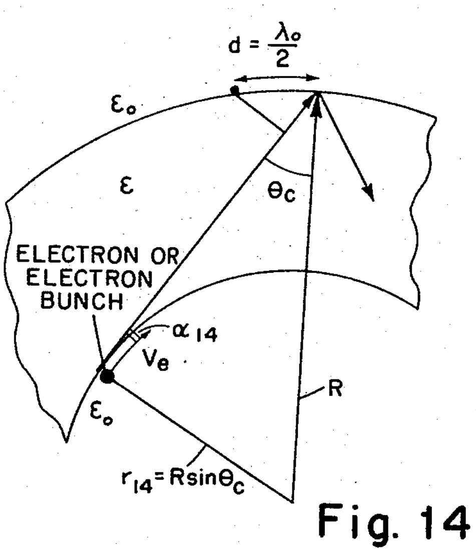
FIGS. 14–17 illustrate four different conditions of superimposed systems of a dielectric resonator and Cerenkov radiating and orbiting electrons.
Figure 15:
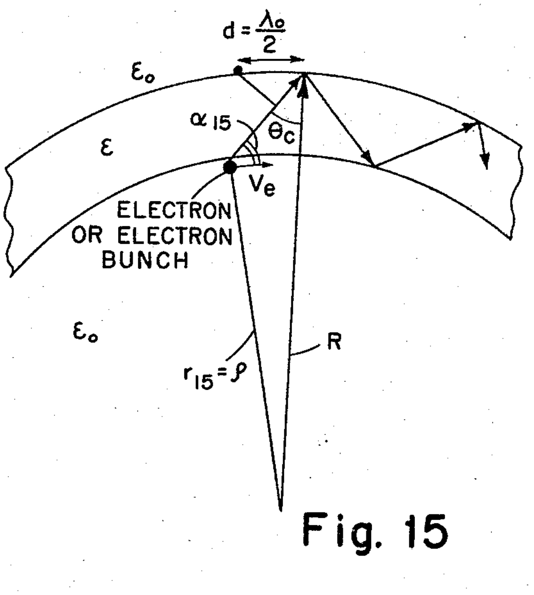

FIGS. 14 and 15 illustrate the case where the dielectric rings are in a resonant mode with $\theta=\theta_c$ (one of the lines according to ray optics is drawn in for all four cases). On the other hand FIGS. 16 and 17 show resonant modes for which $\pi/2>\theta>\theta_c$ ($\theta_c$ is shown in these figures with dotted lines).

Figure 16:
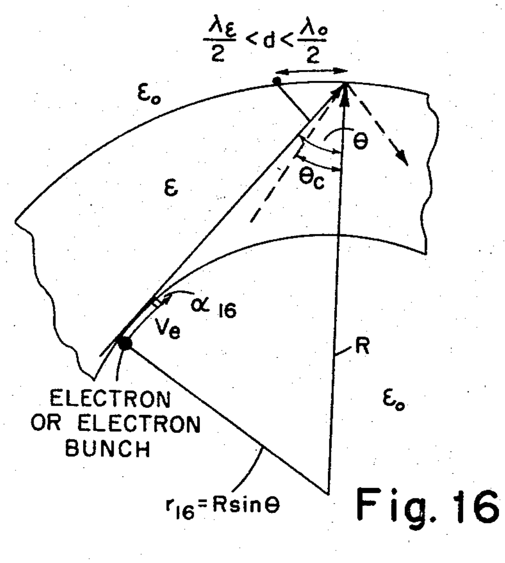
Figure 17:
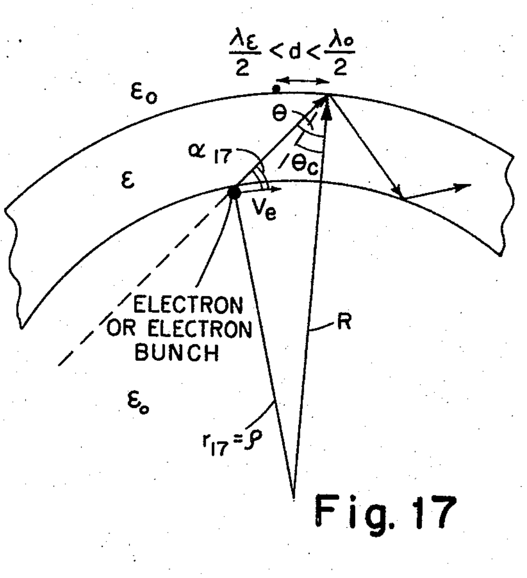

In FIGS. 14 and 16 the inner radii of the dielectric resonators are $r_{14}=R \sin \theta_c$ and $r_{16}=R \sin \theta$, while in FIGS. 15 and 17 the dielectric rings are made thinner by making $R>r_{15}>r_{14}$ and $R>r_{17}>r_{16}$ while keeping the outer radius equal to R. Modes of the dielectric rings in FIGS. 14 and 16 are maintained by reflections on the outer cylindrical walls only, while in FIGS. 15 and 17 the modes are formed by alternate reflections of rays on both inner outer surfaces.

If an electron (or an electron bunch) travels at sufficient speed at the inner wall of the dielectric cylinder (assuming that the electron travels at constant angular velocity and in a perfectly circular orbit) the Cerenkov condition is satisfied and the electron will radiate at an angle which is given by the Cerenkov relation (Equation 1 which may be rewritten as $$\cos \alpha=\frac{1}{\beta n}=\frac{c}{v_e \cdot n}=\frac{c}{n} \cdot \frac{1}{r \omega_e} \tag{12}$$

where $r$ is the radius of electron orbit, or inner radius of the dielectric resonator and $\omega_e$ is the angular cyclotron frequency of the electron such that $\omega_e=eH/m_e c$ where $e$ and $m_e$ are the charge and mass of the electron, respectively.

In FIGS. 14–17, $\alpha_{14}=0=\alpha_{16}$, but $\alpha_{15}\neq 0 \neq \alpha_{17}$.

One finds that independently of the radius of the orbit of the electron, between $R \sin \theta<r<R$, if the angular frequency $\omega_e$ is the same, the emitted Cerenkov radiation will always feed the same mode. This can be seen by correlating FIGS. 14 and 15 for mode $\theta_c$; or by correlating FIGS. 16 and 17 for mode $\theta$ of the general case ($\pi/2>\theta>\theta_c$).

A few of the relations between the size, the material from which the dielectric resonator is made, its mode of operation, and the compatible angular or tangential velocities of the electron are given below.

First, the allowed resonant incident angles ($\theta$, or resonant modes) of a dielectric cylinder with outer radius R may be given as $$\theta=\sin^{-1} \frac{\lambda_\epsilon \cdot m}{2\pi R} \tag{13}$$

between $$\pi/2>\theta\geqq\theta_c$$

where $m$ is an integer, and also $2\pi R/\lambda_\epsilon \geqq m \geqq 2\pi R/\lambda_0$.

Second, the angular frequency ($\omega_e$) for the electron required to have its emitted Cerenkov radiation feed the mode with $\theta$ of a dielectric resonator with outer radius R and critical angle of medium $\theta_c$ must be $$\omega_e(R,\theta_c,\theta)=c \cdot \frac{1}{R} \frac{\sin \theta_c}{\sin \theta}=\frac{2\pi}{\lambda_0} \cdot \frac{c}{m}=\frac{\omega}{m} \tag{14}$$

where $$\theta_c=\sin^{-1} \frac{1}{n}=\sin^{-1}\sqrt{\frac{\epsilon_0}{\epsilon}}$$

$\theta$=as above (one of the allowed operating angles see Equation 13
$m$=an integer, and
$\omega$=frequency of resonance of mode with $\theta$ of dielectric ring Equation 14 shows that the angular velocity or frequency must be a subharmonic of the resonant frequency of mode $\theta$ of the dielectric resonator. Or vice versa, the frequency of the mode $\theta$, which can only be one of those given by Equation 13 which is supported by the Cerenkov radiation of the electron rotating in a circular orbit with angular frequency $\omega_e$, is necessarily $$\omega=\omega_m=m \cdot \omega_e \tag{15}$$

The oscillation frequency of mode $\theta$ is equal to an integer times the orbital frequency of the electron. Further this integer must lie between $$2\pi R/\lambda_0 \leqq m \leqq 2\pi R/\lambda_\epsilon \tag{16}$$

and $m$ is a function of $\omega$ and $\omega_e$.

It should be recalled at this point that Equation 5 which was derived for linearly moving electrons without being coupled with any resonant medium is analagous to Equation 15 of the circular orbit scheme.

One can easily obtain the expression for the required tangential velocity of the electron traveling in a circular orbit at the inner surface of the dielectric cylinder with radius $r$ for which $R \geqq r \geqq R \sin \theta$.

$$v_e=c \cdot \frac{r}{R} \cdot \frac{\sin \theta_c}{\sin \theta} \tag{17}$$

and $$\beta=\frac{v_e}{c}=\frac{r}{R} \cdot \frac{\sin \theta_c}{\sin \theta} \tag{18}$$

Then the direction of emitted Cerenkov radiation from the Cerenkov relation, Equation 1

$$\cos \alpha=\frac{1}{\beta n}=\frac{R}{r} \cdot \sin \theta \tag{19}$$

is the required angle ($\alpha_{17}$) in FIG. 17 for the mode $\theta$.

Because the emitted Cerenkov power is the radial component of the Poynting vector, one can see that the cases with $\alpha=0$ (see FIGS. 14 and 16) are threshold cases. If, for these cases, the electron velocity is less than that required by the Cerenkov condition then there is no radiated power. If, on the other hand, the velocity of the electron is greater than that prescribed by the Cerenkov relation, radiation will be emitted. However, this will not cause resonance with high Q in the dielectric ring resonator, because these emitted rays will strike at the outer surfaces at smaller angles than the $\theta_c$, and therefore will partially leak out. One can easily see that any other geometry in which the toroid has a thicker wall than dictated by this threshold case will be unsuitable for resonating out electromagnetic waves.

FIGS. 15 and 17 show on the other hand toroids with walls thinner than those defined for the threshold case of FIGS. 14 and 16. As $r/R$ approaches unity, the angle $\alpha$ of emission increases and with it the power lost by the electron through Cerenkov radiation, that is, the energy transferred from kinetic energy of the electron to electromagnetic energy stored in the resonator, increases proportionately. For other reasons not detailed here the $r/R \cong 1$ case is also undesirable since the dielectric resonator performance is degraded. There is an optimum for $r/R$ between $1>r/R>\sin \theta$, which depends among other things upon the properties of the dielectric material.

Because of the large number of variables involved, there are many different ways of looking at the material-electron interaction in this kind of gometry. The combination of FIGS. 18 through 21 represents another way of illustrating this interaction described above. It is a purpose of this representation to show graphically the ranges of operation of different parameters.

Figure 18:
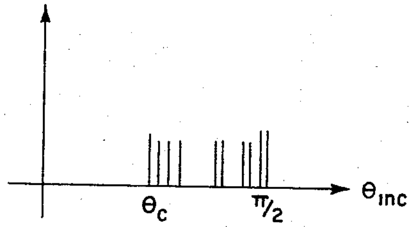
FIGS. 18–21 represent graphically the different ranges of operation of the different parameters of complete systems.

FIG. 18 shows a possible set of the allowed included angles for a particular system in accordance with Equation 13. One can easily see now, based on the above argument, that for a cylinder with finite geometry, the incident angles ranging between $\theta_c$ and 90° take a finite number of distince values. The number of these distinct modes and their distribution depends on the dielectric constant of the material, the angular frequency ($\omega_e$), harmonic number $m$, and $R$.

Figure 19:
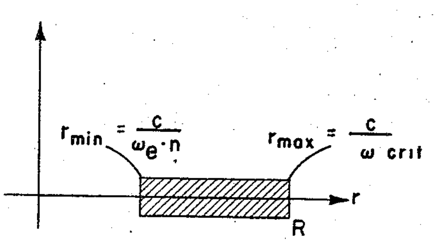
Figure 20:
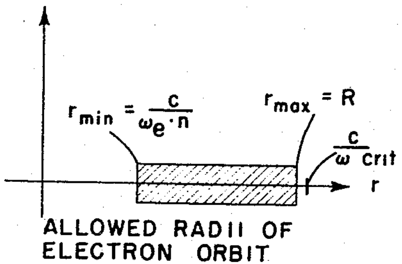
Figure 21:
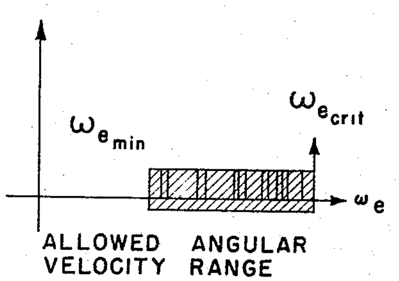

FIGS. 19 and 20 illustrate in qualitative terms the allowed range of radii of electron orbit with modes $\theta=\theta_c$ and $\pi/2>\theta>\theta_c$, respectively. Based on the previous discussion we know that for a homogeneous dielectric cylinder with given R value, the angular velocity and electro orbit radius are the sole factors determining the mode of the dielectric cylinder in which the electron will emit its energy through Cerenkov radiation. Of course there is an upper and lower limit on the radius of the orbit of the electron. The upper value of $r$ is the value with which the electron would travel at a tangential speed which is equal to the velocity of light in vacuum. The lower limit on $r$ is the tangential velocity which would correspond to the speed of light in the dielectric material (below this the Cerenkov condition is not satisfied). The allowed range for the orbit radius increases with increasing $\epsilon$.

There is a further requirement on the maximum orbit allowed for the electrons which is $r\leq R$; which means that the orbit cannot extend beyond the outer surface of the dielectric resonator. For the mode $\theta=\theta_c$ (see FIG. 19) which requires the critical angular frequency $\omega_e=_{\text{ecrit}}$ (see below) these two requirements give the same maximum radius limit for the electric orbit $r_{max}=c/\omega_{\text{ecrit}}=R$, but for any other mode, for which $\pi/2>\theta>\theta_c$ as shown in FIG. 20, $r_{max}=R<c/\omega_{\text{ecrit}}$.

It is helpful to define a critical (or maximum allowed) angular frequency ($\omega_{\text{ecrit}}$) associated with particular dimensions of a dielectric toriod for which one can state that no $\omega_e$ which is larger than $\omega_{\text{ecrit}}$ will feed any of the high Q resonant modes. In other words, if electrons were traveling at larger angular velocities than $\omega_{\text{ecrit}}$, then the feedback mechanism of the resonator would be lossy in that a considerable portion of the radiation would escape through the outer surface of the dielectric resonator.

A physical picture of this critical angular frequency can be given. If an electron travels in an orbit with radius R, and with $\omega_e=\omega_{\text{ecrit}}$, then its tangential speed is equal to the speed of light in vacuum, that is $$\omega_{\text{ecrit}}=c/R.$$

It is now possible to describe the apparatus of this invention which achieves the coupling of the orbiting electron energy with the dielectric resonator taking advantage of the frequency selecting property and feedback mechanism of the dielectric resonator which also provides the necessary medium for the Cerenkov radiaton.

Figure 22:
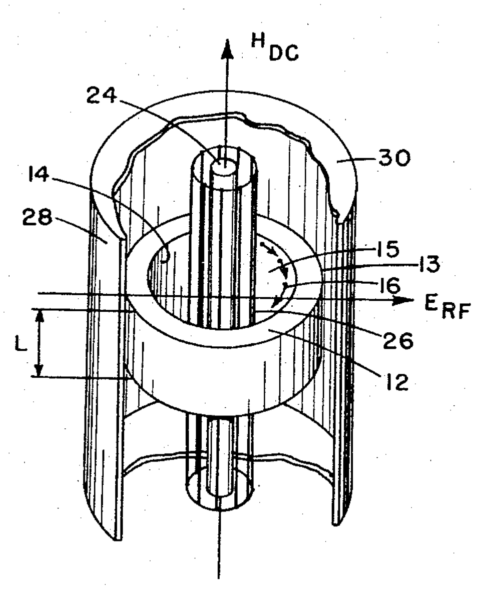
FIG. 22 shows one embodiment of an arrangement in which a microwave cavity surrounds a radiation source.

Various modifications of the apparatus and apparatus components are illustrated in FIGS. 22 through 33. In the aparatus of FIG. 22 there is the dielectric resonator 12 having an outer surface 13 and an inner surface 14, both of which are polished and highly circular. The orbit of the electrons 16 (or electron bunches) is defined by the inner radius of the toroid. In this modification of FIG. 22 the means for providing electrons comprises a cathode 24 constructed in accordance with known practice and an anode 26 which conveniently is a plurality of vertically positioned wires surrounding the cathode in cagelike fashion. By applying an adequate potential across the cathode 24 and anode 26 it is possible to introduce electrons into a interior volume 15 of the dielectric resonator.

In an alternate arrangement the anode grid 26 may be eliminated, since as the cathode is heated the free electrons emitted from the cathode have already acquired a small thermal velocity in the radial direction which can be sufficient to move them away from the cathode so that they can begin interacting with the driving RF electric field, and spiral outward as the acquired kinetic energy of electrons increases.

Electrons may be introduced into the system by other suitable known means such as by injecting them from electron gun means through a hole in the dielectric resonator or directing them into the dielectric resonator in a way to cause them to spiral downwardly or upwardly within volume 15.

In order to maintain these electrons in orbit within the dielectric resonator a magnetic field is applied along the longitudinal axis as indicated by the arrow $H_{DC}$. This is conveniently accomplished by placing the dielectric resonator and its attendant equipment components between the poles of a magnet, either a permanent magnet or an electromagnet. The direction of the DC magnetic field will determine the direction in which the electrons travel in their orbit.

A practical scheme must provide means for driving electrons (imparting kinetic energy to them) into the desired orbit and keep them there in spite of their continuous energy loss through radiation (and other losses which are associated with less than ideally perfect operation of the radiation source of this invention). One of the possible ways to achieve this is illustrated in FIGS. 22 and 23.

A microwave field is applied perpendicular to the magnetic field as indicated by the arrow $E_{RF}$. This is conveniently supplied by a microwave cavity 30, defined by wall 28 surrounding and enclosing the dielectric resonator as shown in FIG. 22. The microwave cavity may be of any known design which provides the proper frequency and direction of electromagnetic field to impart the desired angular velocity to the electrons and to supply that energy given up by the electrons in the radiation process and lost through various mechanisms such as interception by the dielectric wall. FIG. 23 shows the microwave electric lines of a microwave cylindrical cavity operating in the $TE_{111}$ mode at a transverse cross-section.

Figure 23:
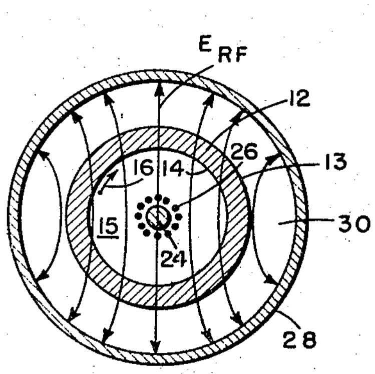
FIG. 23 is a cross-section of the apparatus of FIG. 22 showing the microwave electrical field lines.

Inasmuch as the role of the microwave cavity shown in FIGS. 22 and 23 is that of an electron driving mechanism other driving means may be substituted for the microwave cavity. These other driving means include, but are not limited to, techniques and principles applied in such devices as betatrons, cyclotrons, synchrocyclotrons, synchrotrons, and microtrons. In using any one of these driving schemes, it is of course necessary to so design the system that the outer cylindrical surface 13 of the dielectric resonator of FIGS. 5 and 7 does not come into physical contact with anything, except, at most, with some coupling mechanism as discussed below. The support of the dielectric resonator must be made from the end surfaces of FIGS. 5 and 7. FIG. 22 illustrates the essential part of the dielectric resonator inside a microwave cavity. If the length L of the dielectric resonator is substantially shorter than that of the microwave cavity and if the resonator is placed at the center (both lengthwise and radially) of the cavity, then the microwave electric field intensity will be reasonably uniform over L. However, for construction purposes the dielectric resonator can be made as long as the microwave cavity and end surfaces of both microwave cavity and dielectric resonator mounted or fastened together. This geometry also makes the mathematical analysis simpler.

At this point it is worthwhile to discuss the electron dynamics of the system briefly. Electrons start out from the center in the model given above as an illustration of a possible embodiment of the invention. Independently of their kinetic energy their angular frequency is determined by the intensity of the applied DC magnetic field according to the cyclotron resonance condition.

$$\omega_e=eH/m_ec \qquad (20)$$

where $e$=charge of electrons
$m_e$=mass of electrons
$H$=applied DC magnetic field intensity
$c$=velocity of light
$\omega_e$=angular frequency of electrons If an RF electric field is applied with arbitrary amplitude and with a frequency equal to that of $\omega_e(H)$, those electrons which happen to be in phase with the RF electric field will absorb energy, which will increase their kinetic energy; those in the wrong phase will be retarded giving part of their kinetic energy back into the RF driving electric field. It can be seen that a phase-stable region will develop both in time and space, which in physical terms is equal to saying that an angular bunching takes place in the orbit. The phase-stable region is such that while the phase-stable point, which is the center of the phase-stable region, is traveling around with the resonant angular frequency (determined by the $H_{DC}$ and $f_{res.}$ value pair) electrons tend to gather in this region. In general electrons are oscillating both in angular and radial directions around the phase-stable point, the frequency of which is associated with electron plasma frequency. But on a macroscopic scale it is in most cases sufficient to treat the system as a bunch of electrons traveling at the phase-stable point. Energy is absorbed continuously and with the kinetic energy, the radii of electron orbits are also increasing, and spiraling out. If the RF electric field amplitude is larger fewer turns will be needed for the electrons to get out to the neighborhood of the inner wall of the dielectric resonator. As the radius of electron orbit approaches the radius of the inner diameter of the dielectric toroid, the electron begins to feel the nearness of the dielectric, and begins to transfer a small part of its kinetic energy in the form of Cerenkov radiation into the dielectric ring out of which (if the ring is designed according to the principles described before), this coupled in radiation can no longer escape.

The rate of growth of kinetic energy of electrons therefore slows down. This slowing down process continues until an orbit is reached which is sufficiently close to the inner dielectric wall so that the amount of energy transferred into the toroid per cycle is exactly equal to the energy acquired by the electrons from the electric RF field by traveling around the orbit once. This is therefore a stable orbit ($s_{st}$) for which in the general case ($r-s_{st}$) is in the order of a wavelength of the radiated frequency or the operating frequency of the dielectric toroid. One can see that the separation of electron-dielectric wall ($r-s_{st}$) will be somewhat larger if the driving RF electric field intensity is smaller. Because the coupling to the dielectric wall drops off very rapidly, the ($r-s_{st}$) value is practically the same for a large range of different driving field intensities. However, the same mode of the dielectric toroid is supported along L of the dielectric resonator, even though the E field intensity and ($r-s_{st}$) may vary.

Figure 25:
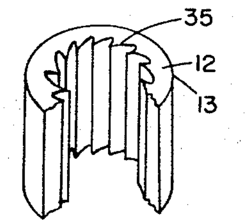
FIGS. 24 and 25 illustrate two possible forms of perturbations on the inner wall of the dielectric resonator.
Figure 24:
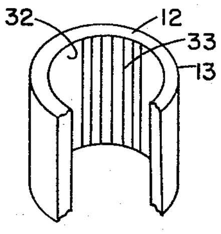

Certain modifications may be made to either or both the interior wall 14 or exterior wall 13 of the hollow cylinder in order to boost coupling selectively to one particular mode only, or in general to enhance the power radiated into the $m^{th}$, $2m^{th}$, etc., harmonic of the $\omega_e$. Two such modifications for the interior wall only are illustrated in FIGS. 24 and 25. The surface modification is in the form of some type of cyclic periodic structures in the inside surface of the dielectric resonator. One possible way of achieving a suitable surface modification is by vacuum depositing thin and narrow metallic strip 33 on the interior surface 14 to give an overall interior surface 32 which is in the form of a fine grating. The same type of grating effect may be obtained to give a surface such as shown at 35 in FIG. 25 by actually machining grooves in the interior wall of the hollow cylinder.

Another possible technique of introducing cyclic periodic perturbations in order to make the $m^{th}$, $2m^{th}$, etc., harmonic of the electron angular frequency dominate would be to modulate the Dc magnetic field intensity periodically in the angular direction. At this point one should mention a possible auxiliary means of making the stable electron orbit even more stable. This can be done by shaping the DC magnetic field in the $r$ direction such as to provide a potential well for the electrons in orbit with radius $s_{st}$.

Figure 26:
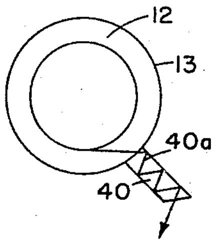
FIGS. 26–31 illustrate several possible means of coupling out a portion of the energy from the dielectric resonator.

Finally, in conjunction with the dielectric resonator of this invention it is necessary to provide means for directing a portion of the Cerenkov radiation developed to a desired area of use. This may be conveniently done by a number of different arrangements, four of which are illustrated in FIGS. 26 through 31. FIG. 26 shows a simple way in which the coherent radiation developed in the resonator may be extracted through the use of a dielectric coupling plate 40 which approaches or touches one side of the dielectric hollow cylinder 12 at the outer surface 13 depending upon the degree of coupling desired. The dielectric coupling plate 40 is disposed in a plane passing through the Z-axis (see FIG. 5) of the cylinder 12. The end of the dielectric coupling 40 opposite the end which abuts the active element 12 is bevelled for example at a 45-degree angle to permit radiation to readily pass out of the plate in a desired beam form. The path of one of the rays passing through the plate is indicated at **40*a***.

Figure 27:
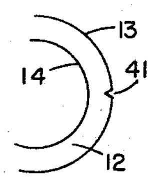
Figure 28:
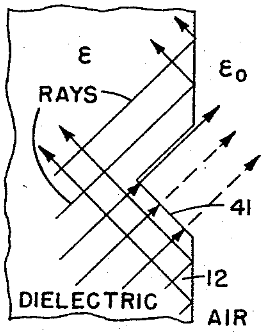
Figure 29:
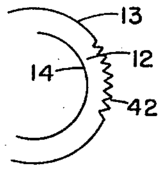

Other arrangements for extracting radiation may be used as illustrated in FIGS. 27 and 28. In these modifications one or more grooves is cut in the outer surface 13 of the cylindrical member 12 in a direction parallel to the Z-axis of the cylinder. Cross-sections of such cylinders are illustrated with grooves 41 in FIG. 27 and 42 in FIG. 29. The path of typical rays generated in the cylinder are illustrated in FIG. 28. In the case of the modifications of FIG. 29 a large number of such grooves (100 to 500 or more depending upon the operating frequency and size of the toroid) may be cut on the outer surface of the cylinder parallel to the Z-axis. Such a series of grooves 42 is in effect a grating which, as illustrated in FIG. 29, can also act as a filter in selecting and directing the different eigenfrequencies of the resonant structure.

Figure 30:
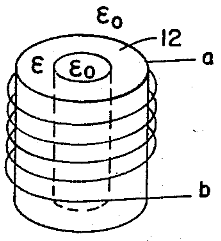
Figure 31:
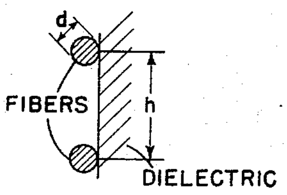

For most modes of operation of the dielectric resonator another very useful coupling scheme is shown in FIGS. 30 and 31. This scheme provides coupling of electromagnetic radiation to fiber waveguides, that is, the energy coupled out is coupled directly into a fiber waveguide, which offers an efficient way of transmitting very high frequency radiation, such as submillimeter and light frequencies. Fibers also have hybrid modes of transmission in addition to the TM and TE modes of regular metal-walled waveguides. The lowest mode does not have a cut-off frequency. In addition, the phase velocity in dielectric waveguides is less or equal to the speed of light in vacuum $c$, in opposition to metal-walled waveguides, where the phase velocity is larger or equal to $c$. Correspondingly, the guide wavelength of dielectric waveguides can vary between $$\lambda_\epsilon \leq \lambda_g \leq \lambda_0 \qquad (21)$$

$$\lambda_\epsilon = \frac{1}{n}\lambda_0 = \frac{1}{\sqrt{\epsilon\mu}}\lambda_0 \qquad (22)$$

The value of this $\lambda_g$ will depend on the mode of propagation, dielectric constant of the fiber, diameter and the frequency.

If the dielectric resonator displays $m$ of λ's around its outer cylindrical wall, this λ is again in between $$\lambda_\epsilon \leq \lambda \leq \lambda_0 \qquad (23)$$

depending on the incident angle $\theta$ of the mode of operation, with the two extremes, as discussed previously:

if $$\theta = \theta_c \text{ then } \lambda = \lambda_0 \qquad (24)$$

and if $$\theta = \pi/2 \text{ then } \lambda = \lambda_\epsilon \qquad (25)$$

Coupling between a particular mode of propagation of a fiber and the dielectric cylinder can be achieved if the fiber is wound on the outside of the cylindrical surface of the dielectric resonator and conditions are adjusted so that the phase velocities become equal, that is $\lambda_g = \lambda$ with the above notation.

Depending on the type of mode of operation traveling or standing wave pattern in the dielectric resonator, the power coupled out will be traveling either only toward $a$ or $b$ of FIG. 30, or toward both $a$ and $b$.

The coupling itself can be adjusted by changing the number of turns of fiber on the outer surface of the toroid, or by slightly changing the phase velocities (or $\lambda_g$ and $\lambda$) with respect to one another.

Ends of the fiber (*a* and *b*) can then be led to where the coherent output is to be used.

Figure 32:
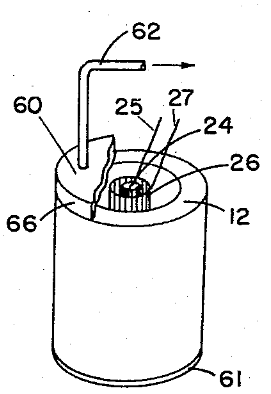
FIG. 32 illustrates one modification of the dielectric resonator suitable for evacuation.

Inasmuch as it is generally preferable to evacuate the inner volume of the hollow dielectric cylinder where the electrons are in orbit, it is necessary to provide some means for sealing off this volume. Thus FIG. 32 illustrates the dielectric resonator equipped with a top 60 and bottom 61 sealed in vacuum-tight relationship to the dielectric cylinder 12. The top and bottom may be formed of the same material from which the dielectric resonator is made, but this is not necessary. An appropriate vacuum line 62 leads through top 60 (or bottom 61 if desired) to a vacuum pump not shown. Leads 25 and 27 to the filaments (cathode and grid) are supplied through the sealing elements 60 and 61 through vacuum-tight seals. It may also, of course, be possible to evacuate the dielectric resonator and seal it so that continuous pumping is not required.

Figure 33:
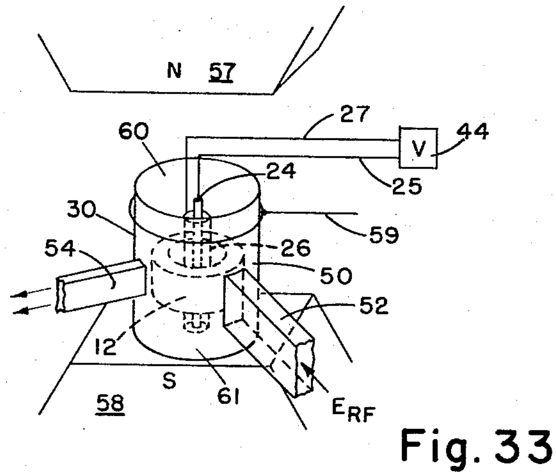
FIG. 33 shows an embodiment of the radiation source apparatus of this invention.

FIG. 33 illustrates one embodiment of the entire apparatus of this invention. The radiation source is generally indicated at 50 and in the cutaway portion of the dielectric resonator 12, the microwave cavity 30, the grid 26 and the cathode 24 are seen. A voltage potential source 44 is connected through proper circuitry including input and output lines 25 and 27 which lead, respectively, to the cathode and the grid 24 and 26. There is also provided a suitable means 54 for extracting Cerenkov radiation as well as a wave guide 52 for introducing the necessary electromagnetic radiation into microwave cavity 30. The magnetic field is applied by a magnet represented by poles 57 and 58. An electromagnet is preferable for turnable radiation sources. The resonator and its associated microwave cavity and radiation extracting means is held in the magnetic field by a suitable support system such as supporting ring 59. It is also, of course, possible to evacuate the entire microwave cavity, but this is not as desirable an arrangement as evacuating the dielectric resonator only as described in conjunction with the discussion of FIG. 32. Evacuation of the entire microwave cavity entails the making of vacuum tight seals between the waveguide 52 and the coupling means 54 and the microwave cavity as well as requiring seals where the lead wires to the filaments enter.

In positioning the dielectric resonator 12 within the microwave cavity as shown in FIG. 33 the electric resonator must be mounted in the central portion of the cavity and in such a manner to prevent physical contact of any kind with the outer cylindrical surface of the dielectric resonator as previously described. The central location is desirable to the providing of a substantially uniform and symmetrical electrical field.

From the above discussion of the theory and description of the method and apparatus of this invention it will be seen that there is provided a radiation source capable of supplying coherent radiation in the millimeter and submillimeter region which processes certain distinct advantages not found in devices of the prior art. A number of these advantages may be listed in summary. They are not necessarily given in order of importance. To begin with the radiation source of this invention does not require working with high voltages since the high DC power supply problems are reduced to those associated with well known microwave techniques. This radiation source is inherently small and flexible in its operation, while at the same time being relatively easy to analyze, design and construct. The radiation source of this invention provides for the selection of electrons in a beam inasmuch as only those will interact with the dielectric material which have the correct velocity and phase; it, moreover, provides a discrete line spectrum output and through selective coupling to the dielectric resonator only one or a few of these lines dominate. Adjustable coupling to the dielectric resonator gives rise to an adjustable loaded Q. Finally, the radiation source of this invention offers the possibility of achieving high efficiencies of operation.

It was pointed out above that one of the uses for an efficient source of coherent radiation in the millimeter and submillimeter region was as a new and heretofore unavailable band for communications. Using communications as only one example of the utility of the radiation source of this invention it may be pointed out that the opening up of this bandwidth would provide approximately thirty times more spectrum space than now available, increase bandwidth capabilities, and provide a communication band which would not be blanked by the ionosphere but which would be available for communication with space vehicles during re-entry. Moreover, such apparatus is capable of realizing greater antenna gain from a fixed aperture while at the same time being considerably smaller in size and weight. Thus it will be seen that in the communications field above, the radiation source of this invention offers many possibilities.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

I claim:

1. An electromagnetic radiation source, comprising in combination (a) a dielectric ring resonator in the form of a hollow cylindrical body defining within it an evacuatable space;

(b) means for supplying electrons in said space, the velocities of said electrons thus supplied having no axial components;

(c) means for sustaining a radial electrostatic field within said space;

(d) means for sustaining an axial direct current magnetic field within said space;

(e) means, in conjunction with said means for sustaining said electrostatic and said direct current magnetic fields, for supplying an electromagnetic field, the electric field component of which is perpendicular to said axial direct current magnetic field and equal to the cyclotron frequency of said supplied electrons (as specified by the intensity of said direct current magnetic field), said means for sustaining said axial direct current magnetic field and said means for supplying said electromagnetic field in combination with said means for sustaining said radial electrostatic field being adapted to impart orbital motion to said supplied electrons whereby they remain in an orbit adjacent the side wall of said cylindrical body at an angular velocity greater than the velocity of light in said dielectric, thereby to generate Cerenkov radiation in said dielectric resonator; the pumping signal level of said supplied electromagnetic field of cyclotron frequency and at a level sufficient to impart to said electrons energy equivalent to that lost through said Cerenkov radiation and operational inefficiencies; and (f) means for extracting a portion of said Cerenkov radiation.

2. An electromagnetic radiation source in accordance with claim 1 wherein said means for supplying electrons comprises a cathode and a grid anode quasi-transparent to radial electron flow surrounding said cathode positioned axially within said hollow cylindrical body, and means for generating an electrical potential between said cathode and anode.

3. An electromagnetic radiation source in accordance with claim 1 wherein said means for supplying an electromagnetic field comprises a metallic cylindrical microwave cavity surrounding said hollow cylindrical body.

4. An electromagnetic radiation source in accordance with claim 1 wherein said means for extracting a portion of said Cerenkov radiation comprises at least one dielectric body adjacent the outer surface of said cylindrical body.

5. An electromagnetic radiation source in accordance with claim 1 further characterized in that said dielectric resonator forms a structure which is resonant at a harmonic if the electron cyclotron frequency.

6. An electromagnetic radiation source in accordance with claim 1 further characterized in that the inner surface of said hollow cylindrical body has periodic perturbations.

7. An electromagnetic radiation source in accordance with claim 6 wherein said periodic perturbations are narrow metal strips parallel to the cylindrical axis whereby said metal strips prevent electrical surface charges from accumulating.

8. An electromagnetic radiation source in accordance with claim 1 wherein said means for extracting a portion of said Cerenkov radiation comprises perturbations associated with the outer surface of said dielectric resonator.

9. An electromagnetic radiation source in accordance with claim 1 wherein said means for extracting a portion of said Cerenkov radiation comprises dielectric fiber waveguide means coupled to said dielectric resonator.

References Cited

UNITED STATES PATENTS

| | | | |
|---|---|---|---|
| 2,942,144 | 6/1960 | Weibel ____________ | 315—4 X |
| 3,178,656 | 4/1965 | Petroff ____________ | 315—3 X |

FOREIGN PATENTS

| | | |
|---|---|---|
| 782,573 | 9/1957 | England. |

OTHER REFERENCES

Coleman: "Cerenkov Radiation Approach to the Submillimeter Wave Problem" Advances in Quantum Electronics, 1961, pp. 581 to 593. QC447.C56.

Lashinsky: "Generation of Microwaves by Cerenkov Radiation," Proceeding of the Symposium on Millimeter Waves, 1959, pp. 181 to 189. TK7801.S84.

HERMAN KARL SAALBACH, *Primary Examiner.*

ELI LIEBERMAN, *Examiner.*

S. CHATMON, Jr., *Assistant Examiner.*